US012485953B1

United States Patent
Yoshikawa et al.

(10) Patent No.: US 12,485,953 B1
(45) Date of Patent: Dec. 2, 2025

(54) RACK GUIDE (71) Applicant: OILES CORPORATION, Fujisawa (JP)

(72) Inventors: Ryouji Yoshikawa, Fujisawa (JP); Tomoki Watanabe, Fujisawa (JP)

(73) Assignee: Oiles Corporation, Fujisawa (JP)

( * ) Notice: Subject to any disclaimer, the term of this patent is extended or adjusted under 35 U.S.C. 154(b) by 0 days.

(21) Appl. No.: 18/872,740

(22) PCT Filed: Jun. 15, 2023

(86) PCT No.: PCT/JP2023/022287
§ 371 (c)(1),
(2) Date: Dec. 6, 2024

(87) PCT Pub. No.: WO2024/004688
PCT Pub. Date: Jan. 4, 2024

(30) Foreign Application Priority Data

Jun. 27, 2022 (JP) .................................. 2022-102333

(51) Int. Cl.
*B62D 3/12* (2006.01)
*F16H 19/04* (2006.01)

(52) U.S. Cl.
CPC ............. *B62D 3/126* (2013.01); *F16H 19/04* (2013.01)

(58) Field of Classification Search
CPC ........... F16H 2055/0281; F16H 55/283; B62D 3/123
See application file for complete search history.

(56) References Cited

U.S. PATENT DOCUMENTS

| 7,926,376 B2 * | 4/2011 | Hirose | B62D 3/123 384/42 |
| 11,691,661 B2 * | 7/2023 | Krishnan | F16H 55/283 74/409 |
| 2019/0135329 A1 * | 5/2019 | Feldpausch | B62D 3/123 |

FOREIGN PATENT DOCUMENTS

| FR | 2851540 A1 | 8/2004 |
| JP | 50-083938 A | 7/1975 |
| JP | 2002-370654 A | 12/2002 |

(Continued)

OTHER PUBLICATIONS

International Search Report and Written Opinion issued in International Application No. PCT/JP2023/022287, mailed on Sep. 5, 2023.

(Continued)

*Primary Examiner* — Jake Cook
(74) *Attorney, Agent, or Firm* — Knobbe, Martens, Olson & Bear, LLP (57) ABSTRACT

Proposed is a rack guide which achieves both a stable feed of a lubricant from a rack bar to a lubricant retaining groove and a stable supply of the lubricant from the lubricant retaining groove to the rack bar when the rack bar slides against the rack guide. At least one pair of lubricant retaining grooves configured to retain a lubricant interposed between a rack bar and a supporting surface and face each other in a rack guide longitudinal direction extend in a rack guide transverse direction perpendicular to the rack guide longitudinal direction and are arranged on the supporting surface in such a shape as to bulge away from each other in the rack guide longitudinal direction. An apex of each of the lubricant retaining grooves in the rack guide longitudinal direction is located in a contact area.

6 Claims, 7 Drawing Sheets

(56) References Cited

FOREIGN PATENT DOCUMENTS

| JP | 2003-312502 A | 11/2003 |
|----|---------------|---------|
| JP | 2006-116994 A | 5/2006 |
| JP | 2007-245828 A | 9/2007 |
| JP | 2017-024620 A | 2/2017 |
| JP | 2019-039496 A | 3/2019 |
| JP | 2021-079886 A | 5/2021 |
| JP | 3232479 U | 6/2021 |
| KR | 10-2022-0080921 A | 6/2022 |

OTHER PUBLICATIONS

Microfilm of the specification and drawings annexed to the request of Japanese Utility Model Application No. 003358/1989 (Laid-open No. 09628/1990) (Oiles Industry Co Ltd) Jul. 31, 1990.
CD-ROM of the specification and drawings annexed to the request of Japanese Utility Model Application No. 071908/1991 (Laid-open No. 035543/1993) (Atsugi Unisia Corp.) May 14, 1993.

\* cited by examiner

⇒ LUBRICANT FLOW ON RACK BAR SIDE
⇨ LUBRICANT FLOW ON SEAT SIDE

FIG.8B

⇒ LUBRICANT FLOW ON RACK BAR SIDE
⇨ LUBRICANT FLOW ON SEAT SIDE

RACK GUIDE

The present application is a U.S. national phase application under 35 U.S.C. § 371 of International Application No. PCT/JP2023/022287, filed on Jun. 15, 2023, which claims the benefit of Japanese Patent Application No. 2022-102333 filed on Jun. 27, 2022 in the Japan Patent Office, the entire disclosure of each of which is incorporated herein by reference.

TECHNICAL FIELD

The present invention relates to a rack guide for a steering device for changing a steering angle of a tire, and particularly to a rack guide for guiding a rack bar in a bar longitudinal direction.

BACKGROUND ART

Conventionally, as a rack guide for guiding a rack bar in a longitudinal direction, there is known a rack guide comprising a multilayer sliding piece having: a pair of inclined surface portions facing each other; a pair of flat surface portions continuous with these corresponding inclined surface portions; a bottom surface portion continuous with each of the flat surface portions; and a hollow protrusion portion extending at the center of this bottom surface portion toward a backing metal side, the multilayer sliding piece being configured to support the rack bar (for example, see Patent Literature 1).

PRIOR ART DOCUMENT

Patent Literature

Patent Literature 1: JP2006-116994A (particularly, see FIG. 2.)

SUMMARY OF INVENTION

Technical Problem

Recessed portions in the inclined surface portions of the multilayer sliding piece of the rack guide as described above are filled with a lubricant, and when the rack bar moves in the rack bar longitudinal direction, the lubricant filling the recessed portions is supplied to the rack bar, whereas it is possible that the lubricant is insufficiently fed to the recessed portions so that the lubricant is drained from the recessed portions.

Thus, the present invention is to solve the problem of conventional technologies as described above and it is an object of the present invention to provide a rack guide which achieves both a stable feed of a lubricant from a rack bar to a lubricant retaining groove and a stable supply of the lubricant from the lubricant retaining groove to the rack bar when the rack bar slides against the rack guide.

Solution to Problem

The invention according to claim 1 is to solve the above problem by a rack guide for a steering device, comprising a supporting surface for supporting a sliding surface provided behind a meshing surface formed on a rack bar having a D-shaped cross section, the rack bar being configured to mesh with a pinion formed on a steering shaft to convert a rotational motion of the steering shaft into a linear motion, the rack guide being configured to guide the rack bar in a bar longitudinal direction of the rack bar to change a steering angle of a tire, in which the sliding surface of the rack bar is a curved surface formed to have a single radius of curvature, the supporting surface is a curved surface having a contact area configured to come into slidable contact with the rack bar and a spaced facing area configured to face the rack bar with a space therebetween, the contact area is located between the spaced facing area on an inner side closer to a rack guide longitudinal center axis configured to extend in a rack guide longitudinal direction parallel to a sliding direction of the rack bar and the spaced facing area on an outer side farther from the rack guide longitudinal center axis, and at least one pair of lubricant retaining grooves configured to retain a lubricant interposed between the rack bar and the supporting surface and face each other in the rack guide longitudinal direction extend in a rack guide transverse direction perpendicular to the rack guide longitudinal direction and are arranged on the supporting surface in such a shape as to bulge away from each other in the rack guide longitudinal direction, and an apex of each of the lubricant retaining grooves in the rack guide longitudinal direction is located in the contact area.

The invention according to claim 2 is to further solve the above problem by, in addition to the configuration of the invention according to claim 1, a feature in which the lubricant retaining groove is formed to be deeper in accordance with bulging of the lubricant retaining groove.

The invention according to claim 3 is to further solve the above problem by, in addition to the configuration of the invention according to claim 1 or claim 2, a feature in which the lubricant retaining groove is formed by a straight portion perpendicular to the contact area of the supporting surface, the contact area extending in the rack guide longitudinal direction, and a bulge portion passing both ends of the straight portion and the apex.

The invention according to claim 4 is to further solve the above problem by, in addition to the configuration of the invention according to claim 1 or claim 2, a feature in which the pair of lubricant retaining grooves are formed to be line-symmetrical, and groove depths of the pair of lubricant retaining grooves are equal to each other.

Effects of Invention

According to the rack guide of the invention according to claim 1, at least one pair of lubricant retaining grooves configured to retain a lubricant interposed between the rack bar and the supporting surface and face each other in the rack guide longitudinal direction extend in a rack guide transverse direction perpendicular to the rack guide longitudinal direction and are arranged on the supporting surface in such a shape as to bulge away from each other in the rack guide longitudinal direction, and an apex of each of the lubricant retaining grooves in the rack guide longitudinal direction is located in the contact area, whereby, while the rack bar slides in the bar longitudinal direction, even when the lubricant retained near the apex of the lubricant retaining groove is dragged by the lubricant adhering to the rack bar so as to flow out from the lubricant retaining groove to the exterior of the lubricant retaining groove, in accordance with such outflow of the lubricant near the apex of the lubricant retaining groove, the lubricant in the spaced facing area on the inner side and in the spaced facing area on the outer side is drawn toward the vicinity of the apex of the lubricant retaining groove and the lubricant flows from at least one of the supporting surface and the rack bar into the lubricant retaining groove and is thus fed thereinto, which can achieve both a stable feed of the lubricant from the rack bar to the lubricant retaining groove and a stable supply of the lubricant from the lubricant retaining groove to the rack bar.

According to the rack guide of the invention according to claim 2, in addition to the effects produced by the rack guide of the invention according to claim 1, the lubricant retaining groove is formed to be deeper in accordance with bulging of the lubricant retaining groove, which makes it easier for the lubricant to accumulate at an outer end side of the lubricant retaining groove with a great groove depth and makes it easier for the lubricant to flow out of an inner end side of the lubricant retaining groove with a shallow groove depth, and when the rack bar slides to the outer end side of the lubricant retaining groove, in accordance with outflow of the lubricant from the outer end side of the lubricant retaining groove due to sliding of the rack bar, the lubricant in the spaced facing area on the inner side and in the spaced facing area on the outer side flows into the lubricant retaining groove and is retained at the outer end side of the lubricant retaining groove, so that when the rack bar slides to the inner end side of the lubricant retaining groove, in accordance with sliding of the rack bar, the lubricant retained near an inner end of the lubricant retaining groove flows so as to adhere to the rack bar, which can reliably achieve both a stable feed of the lubricant from the rack bar to the lubricant retaining groove and a stable supply of the lubricant from the lubricant retaining groove to the rack bar.

According to the rack guide of the invention according to claim 3, in addition to the effects produced by the rack guide of the invention according to claim 1 or claim 2, the lubricant retaining groove is formed by a straight portion perpendicular to the contact area of the supporting surface, the contact area extending in the rack guide longitudinal direction, and a bulge portion passing both ends of the straight portion and the apex, which makes it easier for the lubricant retained near the straight portion of the lubricant retaining groove to adhere to the rack bar rather than flowing in the rack guide transverse direction when the rack bar slides toward a straight portion side of the lubricant retaining groove, so that when the rack bar slides against the rack guide, the lubricant can be stably supplied from the lubricant retaining groove to the rack bar, which can consequently make it easier to achieve both a stable feed of the lubricant from the rack bar to the lubricant retaining groove and a stable supply of the lubricant from the lubricant retaining groove to the rack bar.

According to the rack guide of the invention according to claim 4 of the present invention, in addition to the effects produced by the rack guide of the invention according to claim 1 or claim 2, the pair of lubricant retaining grooves are formed to be line-symmetrical, and groove depths of the pair of lubricant retaining grooves are equal to each other, so that an inflow amount of the lubricant into the pair of lubricant retaining grooves and an outflow amount of the lubricant out of the pair of lubricant retaining grooves balance with each other, which can make it easier to keep constant a total amount of the lubricant retained by the rack guide.

DESCRIPTION OF EMBODIMENTS

Any specific embodiment of the present invention may be suitable as long as a rack guide for a steering device comprises a supporting surface for supporting a sliding surface provided behind a meshing surface formed on a rack bar having a D-shaped cross section, the rack bar being configured to mesh with a pinion formed on a steering shaft to convert a rotational motion of the steering shaft into a linear motion, the rack guide being configured to guide the rack bar in a bar longitudinal direction of the rack bar to change a steering angle of a tire, in which the sliding surface of the rack bar is a curved surface formed to have a single radius of curvature, the supporting surface is a curved surface having a contact area configured to come into slidable contact with the rack bar and a spaced facing area configured to face the rack bar with a space therebetween, the contact area is located between the spaced facing area on an inner side closer to a rack guide longitudinal center axis configured to extend in a rack guide longitudinal direction parallel to a sliding direction of the rack bar and the spaced facing area on an outer side farther from the rack guide longitudinal center axis, and at least one pair of lubricant retaining grooves configured to retain a lubricant interposed between the rack bar and the supporting surface and face each other in the rack guide longitudinal direction extend in a rack guide transverse direction perpendicular to the rack guide longitudinal direction and are arranged on the supporting surface in such a shape as to bulge away from each other in the rack guide longitudinal direction, and an apex of each of the lubricant retaining grooves in the rack guide longitudinal direction is located in the contact area, in which the rack guide achieves both a stable feed of the lubricant from the rack bar to the lubricant retaining groove and a stable supply of the lubricant from the lubricant retaining groove to the rack bar when the rack bar slides against the rack guide.

For example, the rack guide according to the present invention is configured to be mounted in a rack and pinion steering device of a four-wheeled vehicle, and then the four-wheeled vehicle may be not only a gasoline vehicle or a diesel vehicle but also an electric vehicle or the like.

Embodiment 1

Hereinafter, a rack guide 100 according to an embodiment of the present invention will be explained with reference to FIG. 1 to FIG. 8B.

<1. Rack Guide Installation Environment>

First, an environment in which the rack guide 100 is mounted will be described with reference to FIG. 1 which is a cross-sectional view of a rack and pinion steering device in which a rack guide according to an embodiment of the present invention is installed.

Figure 1:
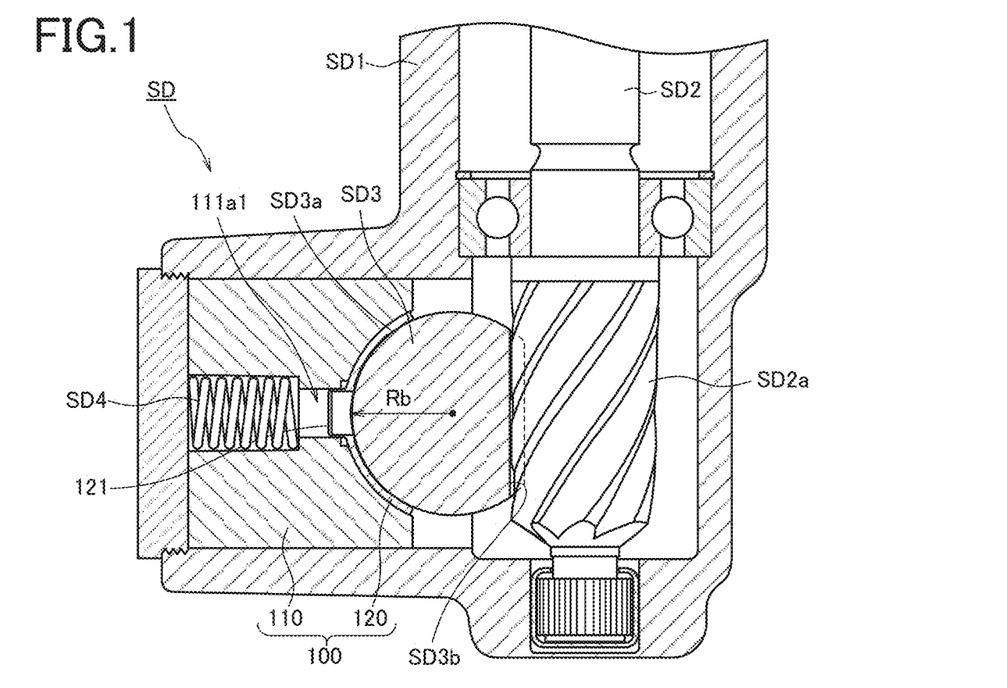
FIG. 1 is a cross-sectional view of a rack and pinion steering device in which a rack guide according to an embodiment of the present invention is installed.

As illustrated in FIG. 1, the rack guide 100 according to the present embodiment is configured to be mounted in a rack and pinion steering device SD of a four-wheeled vehicle.

This rack and pinion steering device SD is configured to change a steering angle of tires (unillustrated) and includes a device housing SD1, a steering shaft SD2 configured to rotate integrally with a steering wheel, a rack bar SD3 configured to mesh with this steering shaft SD2 to convert a rotational motion of the steering shaft SD2 into a linear motion, a rack guide 100 configured to guide this rack bar SD3 in a bar longitudinal direction of the rack bar SD3, and a biasing spring SD4 configured to press this rack guide 100 against the rack bar SD3.

A tip of the steering shaft SD2 is provided with a pinion SD2a configured to mesh with the rack bar SD3 which thus rotates integrally with the steering shaft SD2.

As illustrated in FIG. 1, the rack bar SD3 has a sliding surface SD3a which is a curved surface formed to have a single radius of curvature Rb and a meshing surface SD3b which is provided behind this sliding surface SD3a to serve as rack teeth configured to mesh with the steering shaft SD2, and thus the rack bar SD3 has a D-shaped cross section.

The biasing spring SD4 is interposed between the device housing SD1 and the rack guide 100.

<2. Rack Guide Structure>

Next, a structure of the rack guide 100 will be described in detail with reference to FIG. 1 to FIG. 5.

Figure 2:
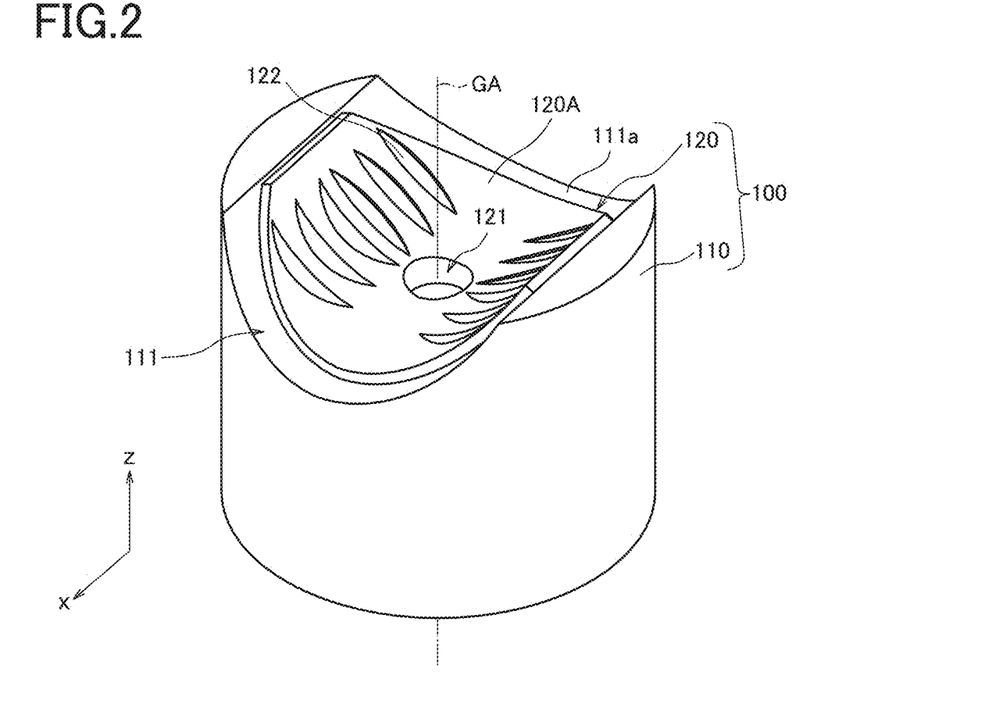
FIG. 2 is a perspective view of the rack guide illustrated in FIG. 1.
Figure 3:
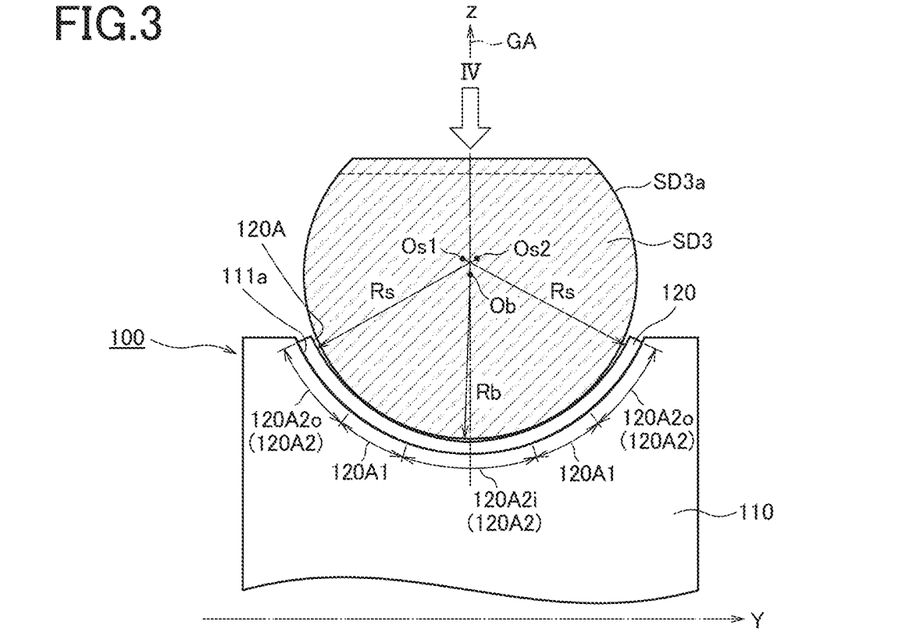
FIG. 3 is a side view illustrating a positional relationship between the rack guide and a rack bar illustrated in FIG. 1.
Figure 4:
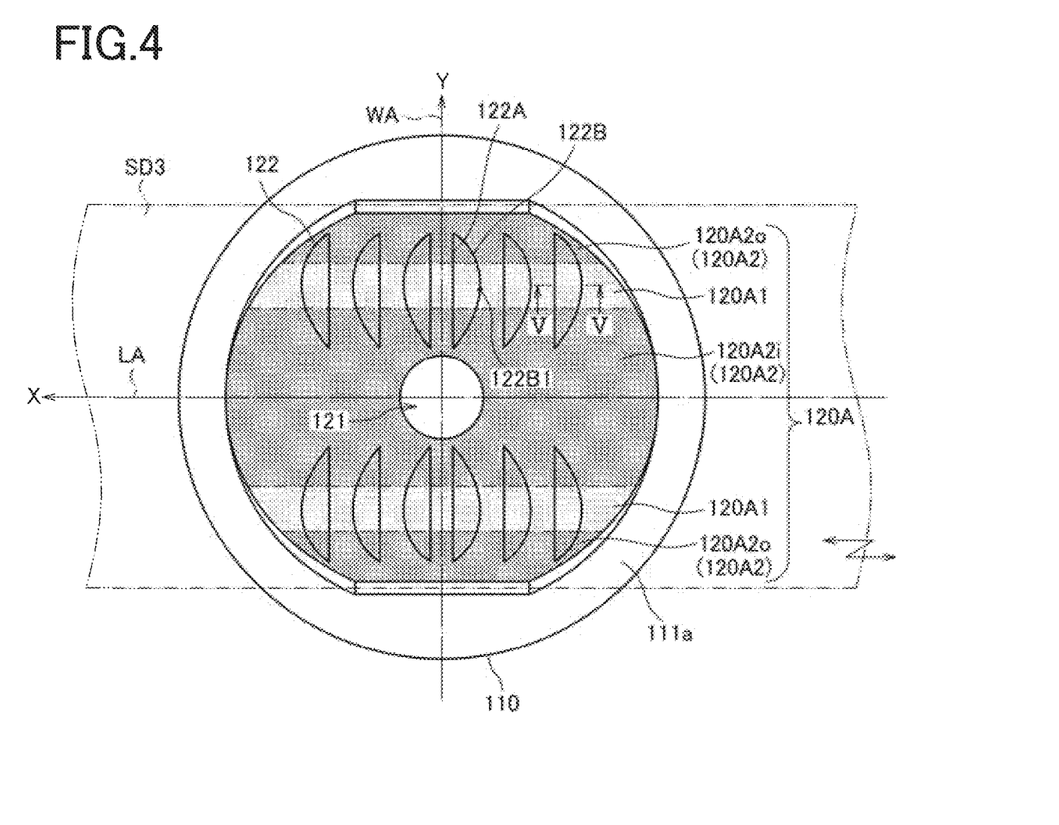
FIG. 4 is a plan view of the rack guide as seen from the IV direction in FIG. 3.
Figure 5:
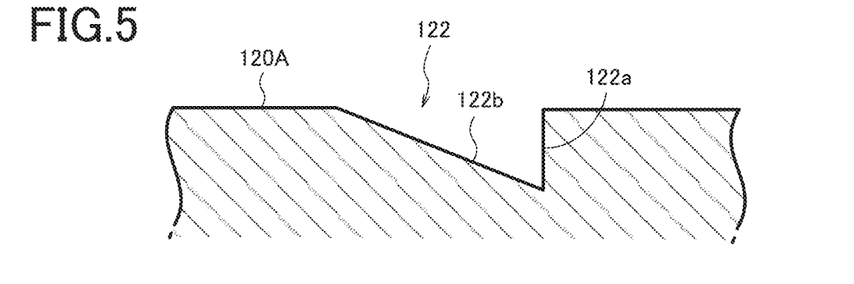
FIG. 5 is an end view of a lubricant retaining groove in the V-V cross section in FIG. 4.

FIG. 2 is a perspective view of the rack guide illustrated in FIG. 1, FIG. 3 is a side view illustrating a positional relationship between the rack guide and a rack bar illustrated in FIG. 1, FIG. 4 is a plan view of the rack guide as seen from the IV direction in FIG. 3, and FIG. 5 is an end view of a lubricant retaining groove in the V-V cross section in FIG. 4.

As illustrated in FIG. 2, etc., the rack guide 100 is provided with a rack guide body 110 and a seat 120.

<2.1. Rack Guide Body>

As illustrated in FIG. 2, the rack guide body 110 is a cylindrical member made of a metal.

Then, on one end side of this rack guide body 110, there is formed a seat placement groove 111 configured to extend in a seat placement groove longitudinal direction (x direction in FIG. 2) perpendicular to a direction in which a longitudinal center axis of the rack guide body 110 (rack guide center axis GA) extends (z direction in FIG. 2).

As illustrated in FIG. 1 and FIG. 3, a cross-sectional shape of this seat placement groove 111 is semicircular.

Then, as illustrated in FIG. 1, a facing surface 111a of the seat placement groove 111 which faces the sliding surface SD3a of the rack bar SD3 is provided with a seat engagement hole 111a1 configured to engage with a convex portion 121 of the seat 120.

<2.2. Seat>

The seat 120 is a member made of a resin having an excellent self-lubricating property (for example, a fluororesin, such as PTFE, a nylon resin or a polyacetal resin, such as POM) and has a substantially uniform thickness as illustrated in FIG. 3.

Then, as illustrated in FIG. 1 and FIG. 4, the seat 120 has the convex portion 121 formed at the center in a plan view and configured to protrude toward the rack guide body 110.

The seat 120 is integrated with the rack guide body 110 by inserting the convex portion 121 into the seat engagement hole 111a1 of the rack guide body 110 and allowing the same to engage therewith.

Thus, when the seat 120 is assembled to the rack guide body 110, the facing surface 111a of the rack guide body 110 which faces the sliding surface SD3a of the rack bar SD3 is arranged at a position farther away from the rack bar SD3 than a supporting surface 120A of the seat 120 which supports the sliding surface SD3a of the rack bar SD3 as illustrated in FIG. 3.

As illustrated in FIG. 4, the supporting surface 120A of the seat 120 is symmetrical with respect to a seat longitudinal center axis LA configured to pass through the center of the convex portion 121 and extend in a seat longitudinal direction (X direction in FIG. 4) and also with respect to a seat transverse center axis WA configured to pass through the center of the convex portion 121 and extend in a seat transverse direction (Y direction in FIG. 4).

In this case, the seat longitudinal center axis LA and the seat transverse center axis WA are perpendicular to the rack guide center axis GA.

The seat longitudinal direction of the seat 120 is the same direction as the seat placement groove longitudinal direction of the rack guide body 110 and the longitudinal direction (sliding direction) of the rack bar SD3, and the seat longitudinal center axis LA is coaxial with the rack guide longitudinal center axis.

The seat transverse direction of the seat 120 is perpendicular to the seat longitudinal direction of the seat 120, and the seat transverse center axis WA is coaxial with a rack guide transverse center axis.

Further, as illustrated in FIG. 3, when the seat 120 is assembled to the rack guide body 110, the supporting surface 120A has two centers of curvature Os1, Os2.

As illustrated in FIG. 3, these centers of curvature Os1, Os2 are arranged with the rack guide center axis GA therebetween in the Y direction, while being arranged at approximately the same position in the z direction.

Then, a radius of curvature about the center of curvature Os1 and a radius of curvature about the center of curvature Os2 are the same radius of curvature Rs.

In other words, the supporting surface 120A is formed not by a single curved surface, such as the sliding surface SD3a of the rack bar SD3, but by two curved surfaces combined together.

Note that on the rack guide center axis GA, a center of curvature Ob of the rack bar SD3 is located.

Accordingly, when the seat 120 is assembled to the rack guide body 110, the supporting surface 120A has a contact area 120A1 configured to come into slidable contact with the rack bar SD3 and a spaced facing area 120A2 configured to face the rack bar SD3 with a space therebetween as illustrated in FIG. 3 and FIG. 4.

As illustrated in FIG. 3 and FIG. 4, there are the two contact areas 120A1 with the seat longitudinal center axis LA therebetween, each of which is located between a spaced facing area 120A2*i* on the inner side (the side closer to the seat longitudinal center axis LA) and a spaced facing area 120A2*o* on the outer side (the side farther from the seat longitudinal center axis LA) in the rack guide transverse direction (Y direction).

<2.2.1. Lubricant Retaining Groove>

As illustrated in FIG. 2, FIG. 4, etc., the supporting surface 120A of the seat 120 is provided with a plurality of lubricant retaining grooves 122 interposed between the sliding surface SD3*a* of the rack bar SD3 and the supporting surface 120A of the seat 120 to retain a lubricant for allowing the rack bar SD3 to smoothly slide against the seat 120.

As illustrated in FIG. 4, these lubricant retaining grooves 122 are arranged in the supporting surface 120A in such a manner as to be symmetrical with respect to the seat longitudinal center axis LA and the seat transverse center axis WA.

In other words, the lubricant retaining grooves 122 form a pair in the seat longitudinal direction (about the seat transverse center axis WA), and the pair of lubricant retaining grooves 122 are formed to be line-symmetrical with respect to the seat transverse center axis WA.

Then, as illustrated in FIG. 4, each of the lubricant retaining grooves 122 is configured to extend in the seat transverse direction (rack guide transverse direction), while bulging in the seat longitudinal direction (rack guide longitudinal direction) and in a direction farther away from the seat transverse center axis WA.

In other words, the pair of lubricant retaining grooves 122 arranged line-symmetrically with respect to the seat transverse center axis WA bulge in a direction farther away from each other, and each of the lubricant retaining grooves 122 is formed by a straight portion 122A extending in a direction perpendicular to the contact area 120A1 extending in the seat longitudinal direction (i.e., the seat transverse direction) and a bulge portion 122B bulging from both ends of this straight portion 122A.

Then, as illustrated in FIG. 4, an apex 122B1 of this bulge portion 122B in the seat longitudinal direction is located in the contact area 120A1.

A cross-sectional shape of this lubricant retaining groove 122 is illustrated in FIG. 5, and the lubricant retaining groove 122 is formed by a vertical wall surface 122*a* which forms the bulge portion 122B and an inclined surface 122*b* which connects this vertical wall surface 122*a* and the supporting surface 120A with each other.

In other words, the straight portion 122A is a boundary between the inclined surface 122*b* and the supporting surface 120A.

The vertical wall surface 122*a* extends in a thickness direction of the seat 120 and has a height maximum near the apex and minimum near both ends of the straight portion 122A as illustrated in FIG. 2.

In other words, the lubricant retaining groove 122 is formed to be deeper in accordance with bulging of the lubricant retaining groove 122. That is to say, in the seat longitudinal direction, an outer end side (bulge portion 122B) of the lubricant retaining groove 122 farther away from the seat transverse center axis WA is formed to be deeper than an inner end side (straight portion 122A) of the lubricant retaining groove closer to the seat transverse center axis WA.

Thus, groove depths of the pair of lubricant retaining grooves 122 arranged line-symmetrically with respect to the seat transverse center axis WA are equal to each other.

<3. Lubricant Flow>

Next, a flow of a lubricant G interposed between the rack bar SD3 and the rack guide 100 will be described with reference to FIG. 6A to FIG. 8B.

Figure 6A:
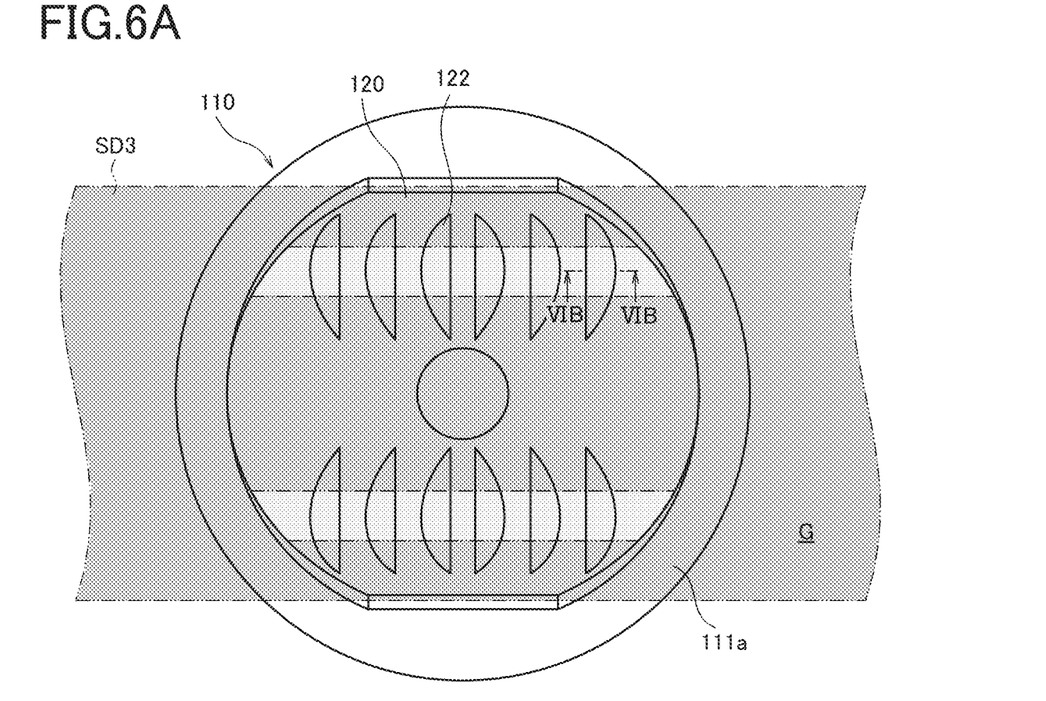
FIG. 6A is a plan view illustrating a positional relationship of the rack guide and the rack bar illustrated in FIG. 1 and the lubricant.
Figure 6B:
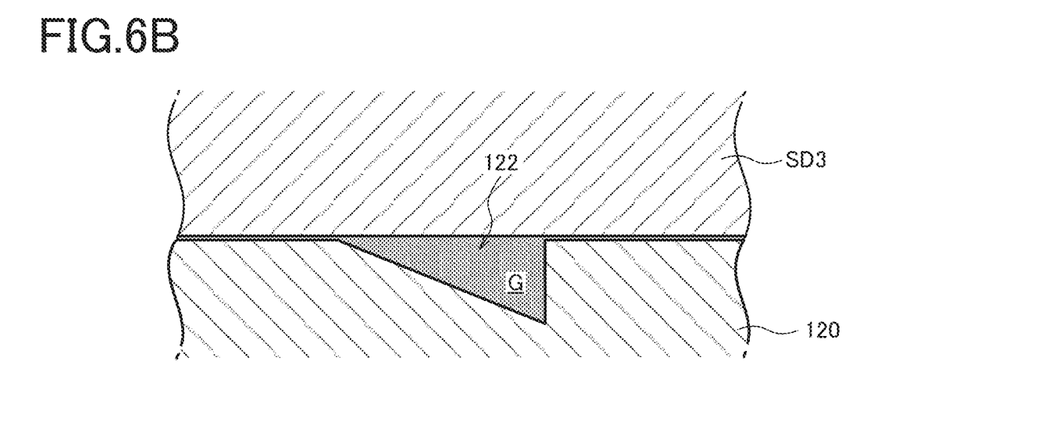
FIG. 6B is an end view of the lubricant retaining groove in the VIB-VIB cross section of FIG. 6A.
Figure 7A:
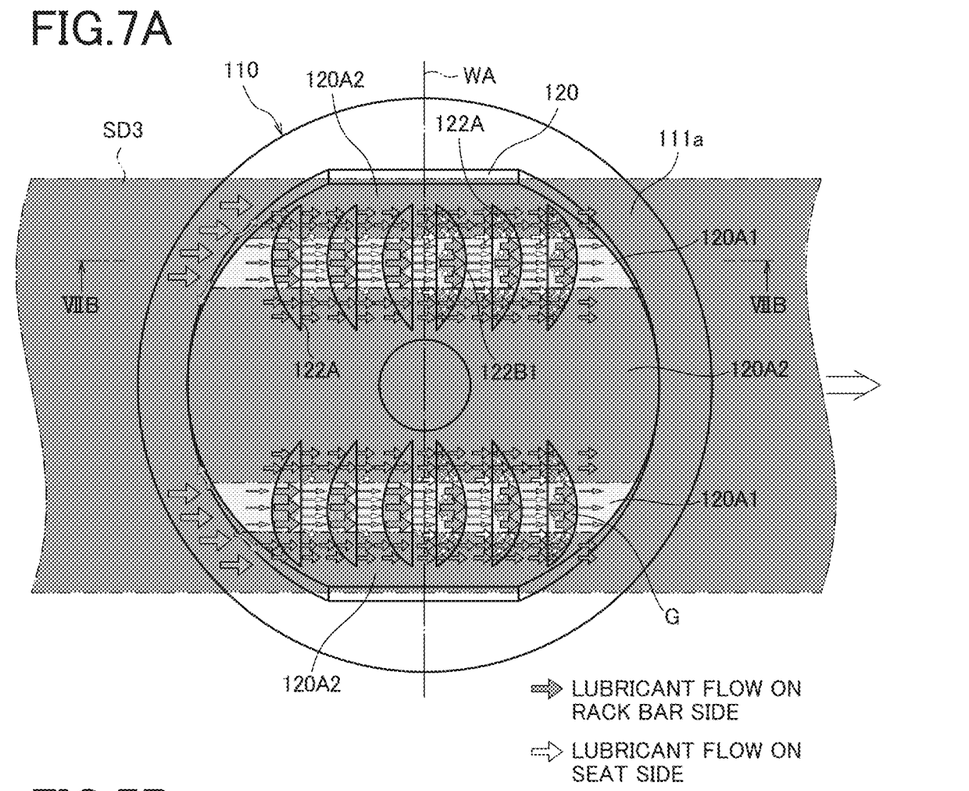
FIG. 7A is a plan view illustrating a flow of the lubricant when the rack bar is moved to the right of the page.
Figure 7B:
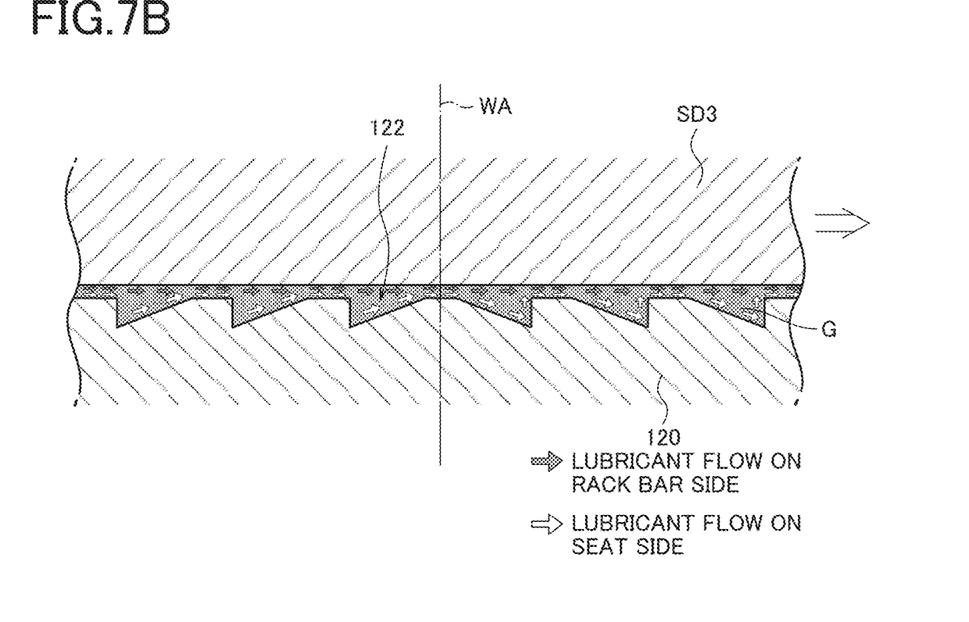
FIG. 7B is an end view of the lubricant retaining groove in the VIIB-VIIB cross section of FIG. 7A.
Figure 8A:
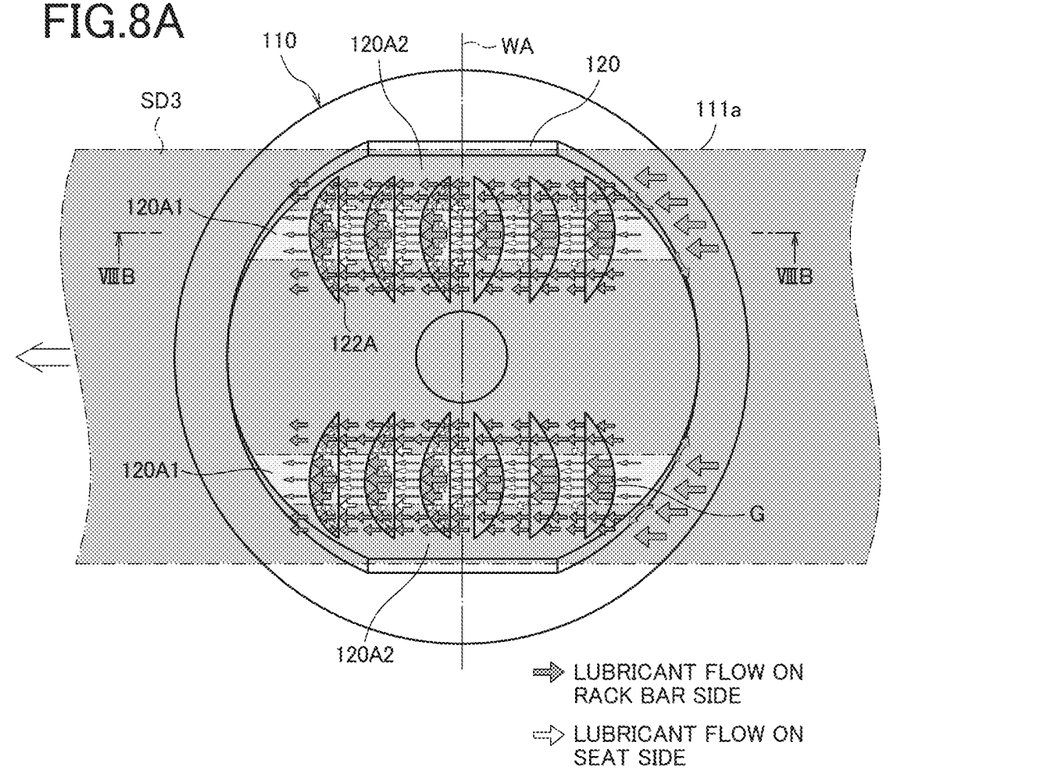
FIG. 8A is a plan view illustrating a flow of the lubricant when the rack bar is moved to the left of the page.
Figure 8B:
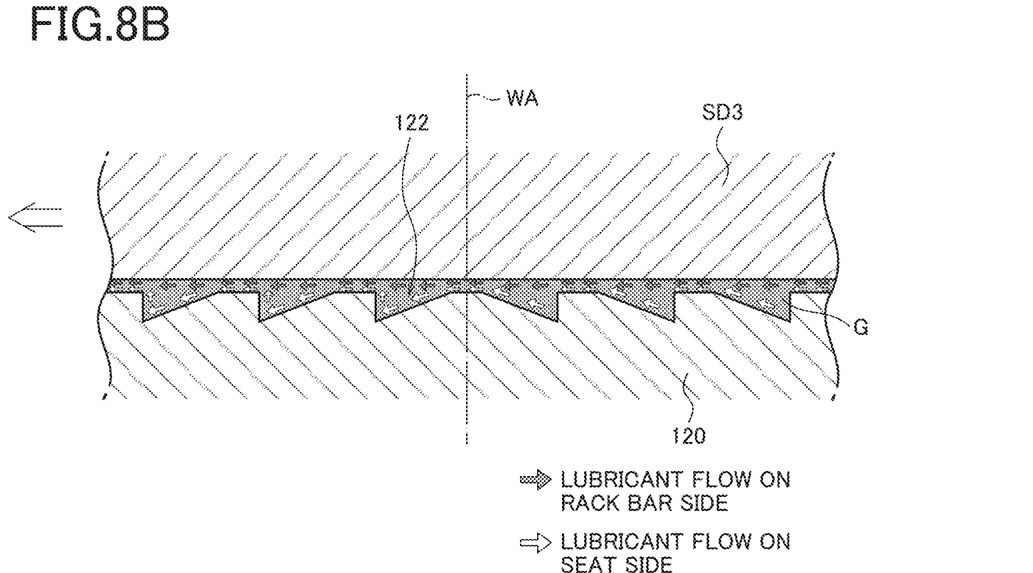
FIG. 8B is an end view of the lubricant retaining groove in the VIIIB-VIIIB cross section of FIG. 8A.

FIG. 6A is a plan view illustrating a positional relationship of the rack guide and the rack bar illustrated in FIG. 1 and the lubricant, FIG. 6B is an end view of the lubricant retaining groove in the VIB-VIB cross section of FIG. 6A, FIG. 7A is a plan view illustrating a flow of the lubricant when the rack bar is moved to the right of the page, FIG. 7B is an end view of the lubricant retaining groove in the VIIB-VIIB cross section of FIG. 7A, FIG. 8A is a plan view illustrating a flow of the lubricant when the rack bar is moved to the left of the page, and FIG. 8B is an end view of the lubricant retaining groove in the VIIIB-VIIIB cross section of FIG. 8A.

In the rack and pinion steering device SD as described above, the lubricant G is applied to the rack bar SD3, so that when the rack bar SD3 slides against the rack guide 100, the lubricant G is interposed between the rack bar SD3 and the rack guide 100 as illustrated in FIG. 6A and FIG. 6B.

<3.1. When the Rack Bar Moves to the Right of the Page>

Then, as illustrated in FIG. 7A and FIG. 7B, when the rack bar SD3 moves to the right of the page, the lubricant G adhering to the rack bar SD3 also moves to the right of the page in accordance with movement of the rack bar SD3 as indicated by gray arrows.

In accordance with such movement of the lubricant G, the lubricant G on the seat 120 side also starts to flow due to the viscosity of the lubricant G.

<3.1.1. Lubricant Flow on the Right Side of the Page of the Seat Transverse Center Axis>

First, a flow of the lubricant G around the lubricant retaining groove 122 arranged on the right side of the page of the seat transverse center axis WA will be described.

As indicated by white arrows in FIG. 7A and FIG. 7B, in accordance with movement of the lubricant G on the rack bar SD3 side, the lubricant G on the seat 120 side in an area in which the lubricant retaining groove 122 of the seat 120 is not provided flows to the right side of the page, i.e., toward the lubricant retaining groove 122 and flows from the straight portion 122A of the lubricant retaining groove 122 into the interior of the lubricant retaining groove 122.

In accordance with such inflow of the lubricant G into the lubricant retaining groove 122, the lubricant G adhering to the rack bar SD3 is also drawn toward the lubricant retaining groove 122.

As indicated by white arrows, the lubricant G retained in the spaced facing area 120A2 of the lubricant retaining groove 122 is drawn into the direction of low flow resistance, i.e., toward the contact area 120A1 rather than climbing over the vertical wall surface 122*a*, so that the lubricant G is retained most near the apex 122B1 in the lubricant retaining groove 122.

Thus, in accordance with movement of the rack bar SD3, the lubricant G retained in the lubricant retaining groove 122 adheres to the rack bar SD3 most in the contact area 120A1, i.e., most near the apex 122B1 in the lubricant retaining groove 122.

<3.1.2. Lubricant Flow on the Left Side of the Page of the Seat Transverse Center Axis>

Next, a flow of the lubricant G around the lubricant retaining groove 122 arranged on the left side of the page of the seat transverse center axis WA will be described.

As indicated by white arrows, in accordance with movement of the lubricant G on the rack bar SD3 side, the lubricant G retained in the lubricant retaining groove 122 flows out to the right side of the page, i.e., from the straight portion 122A of the lubricant retaining groove 122 to the exterior of the lubricant retaining groove 122.

<3.2. When the Rack Bar SD3 Moves to the Left of the Page>

Then, as illustrated in FIG. 8A and FIG. 8B, when the rack bar SD3 moves to the left of the page, the lubricant G adhering to the rack bar SD3 also moves to the left of the page in accordance with movement of the rack bar SD3.

In accordance with such movement of the lubricant G, the lubricant G on the seat 120 side also starts to flow due to the viscosity of the lubricant G, and then the seat 120 is configured to be symmetrical with respect to the seat transverse center axis WA, so that the behavior of the lubricant G on the rack bar SD3 side and the lubricant G on the seat 120 side is exactly the same as that when the rack bar SD3 moves to the right of the page as illustrated in FIG. 7A and FIG. 7B, while the direction of movement of the rack bar SD3 is different.

In other words, if a sliding amount of the rack bar SD3 in a case in which the rack bar SD3 moves to the right of the page is the same as that in a case in which the rack bar SD3 moves to the left of the page, then an inflow amount and an outflow amount of the lubricant G of each of the lubricant retaining grooves 122 roughly balance with each other, so that substantially no increase or decrease occurs in the amount of the lubricant G in the seat 120.

<4. Effects>

According to the rack guide 100 according to the present embodiment as described above, a pair of lubricant retaining grooves 122 configured to retain the lubricant G interposed between the rack bar SD3 and the supporting surface 120A and face each other in the rack guide longitudinal direction extend in the seat transverse direction (rack guide transverse direction) perpendicular to the seat longitudinal direction (rack guide longitudinal direction) and are arranged on the supporting surface 120A in such a shape as to bulge away from each other in the seat guide longitudinal direction, and the apex 122B1 of each of the lubricant retaining grooves 122 in the seat longitudinal direction is located in the contact area 120A1, whereby, while the sliding surface SD3a of the rack bar SD3 slides in the bar longitudinal direction, even when the lubricant G retained near the apex 122B1 of the lubricant retaining groove 122 is dragged by the lubricant G adhering to the rack bar SD3 so as to flow out from the lubricant retaining groove 122 to the exterior of the lubricant retaining groove 122, in accordance with such outflow of the lubricant G near the apex 122B1 of the lubricant retaining groove 122, the lubricant G in the spaced facing area 120A2*i* on the inner side and in the spaced facing area 120A2*o* on the outer side is drawn toward the vicinity of the apex 122B1 of the lubricant retaining groove 122 and the lubricant G flows from at least one of the supporting surface 120A and the rack bar SD3 into the lubricant retaining groove 122 and is thus fed thereinto, which can achieve both a stable feed of the lubricant G from the rack bar SD3 to the lubricant retaining groove 122 and a stable supply of the lubricant G from the lubricant retaining groove 122 to the rack bar SD3.

Consequently, the lubricant G adhering to the sliding surface SD3a of the rack bar SD3 is evenly used, which can extend the lifetime of the rack guide 100.

Moreover, the lubricant retaining groove 122 is arranged in all the contact area 120A1 of the supporting surface 120A, whereby the lubricant can be evenly supplied to the rack bar SD3.

Further, a groove depth of each of a pair of lubricant retaining grooves 122 becomes greater toward a direction in which each of the lubricant retaining grooves 122 bulges, which makes it easier for the lubricant G to accumulate at an outer end side of the lubricant retaining groove 122 with a great groove depth and makes it easier for the lubricant G to flow out of an inner end side of the lubricant retaining groove 122 with a shallow groove depth, and when the rack bar SD3 slides to the outer end side of the lubricant retaining groove 122, in accordance with outflow of the lubricant G from the outer end side of the lubricant retaining groove 122 due to sliding of the rack bar SD3, the lubricant G in the spaced facing area 120A2*i* on the inner side and in the spaced facing area 120A2*o* on the outer side flows into the lubricant retaining groove 122 and is retained at the outer end side of the lubricant retaining groove 122, so that when the rack bar SD3 slides to the inner end side of the lubricant retaining groove 122, in accordance with sliding of the rack bar SD3, the lubricant G retained near an inner end of the lubricant retaining groove 122 flows so as to adhere to the rack bar SD3, which can reliably achieve both a stable feed of the lubricant G from the rack bar SD3 to the lubricant retaining groove 122 and a stable supply of the lubricant G from the lubricant retaining groove 122 to the rack bar SD3.

In addition, the lubricant retaining groove 122 is formed by the straight portion 122A perpendicular to the contact area 120A1 of the supporting surface 120A, the contact area extending in the seat longitudinal direction, and the bulge portion 122B passing both ends of this straight portion 122A and the apex 122B1, which makes it easier for the lubricant G retained near the straight portion 122A of the lubricant retaining groove 122 to adhere to the rack bar SD3 rather than flowing in the seat transverse direction when the rack bar SD3 slides toward a straight portion 122A side of the lubricant retaining groove 122, so that when the rack bar SD3 slides against the rack guide 100, the lubricant G can be stably supplied from the lubricant retaining groove 122 to the rack bar SD3, which can consequently make it easier to achieve both a stable feed of the lubricant G from the rack bar SD3 to the lubricant retaining groove 122 and a stable supply of the lubricant G from the lubricant retaining groove 122 to the rack bar SD3.

<Variants>

The rack guide according to an embodiment of the present invention has been described above, but the rack guide according to the present invention is not limited to the rack guide according to the above embodiment.

For example, in the above embodiment, the rack guide body 110 is made of a metal, but the material of the rack guide body is not limited to a metal, and the rack guide body may be made of, for example, a resin.

For example, in the above embodiment, the seat 120 has a uniform thickness, but the seat thickness may be non-uniform.

For example, in the above embodiment, the number of lubricant retaining grooves 122 in the seat 120 is eight, but the number of lubricant retaining grooves arranged in the seat is not limited to eight as long as the lubricant retaining grooves are arranged symmetrically with respect to the seat longitudinal center axis LA and the seat transverse center axis WA.

For example, in the above embodiment, the rack guide 100 is made from two members, i.e., the rack guide body 110 and the seat 120, but the rack guide body and the seat may be integrally formed.

For example, in the above embodiment, the pair of lubricant retaining grooves 122 are positionally aligned in the seat transverse direction, but the pair of lubricant retaining grooves is not limited to this configuration as long as the lubricant retaining grooves form a pair in the rack guide longitudinal direction, and the pair of lubricant retaining grooves may be offset, for example, in the seat transverse direction.

Figure 9A:
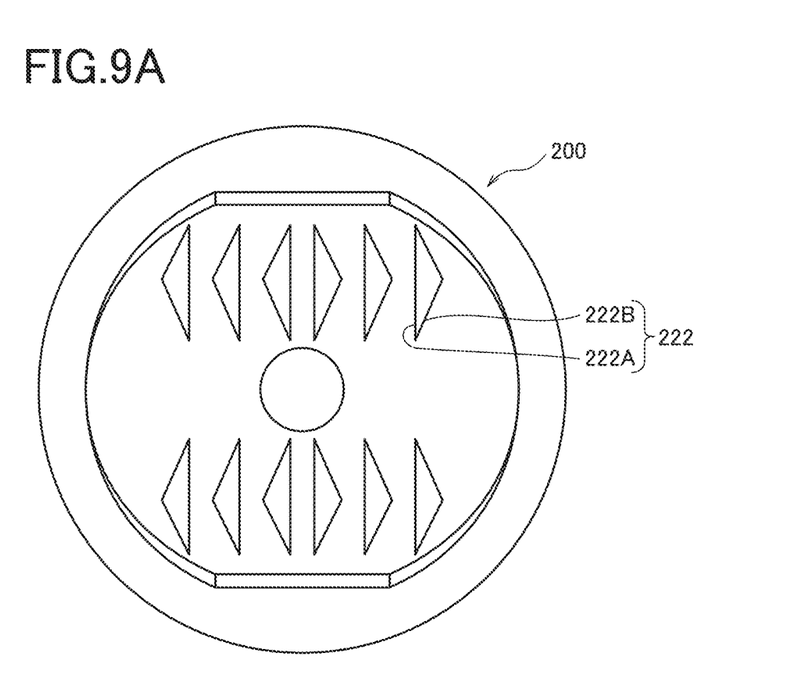
FIG. 9A is a plan view of a rack guide according to a first variant of the present invention.
Figure 9B:
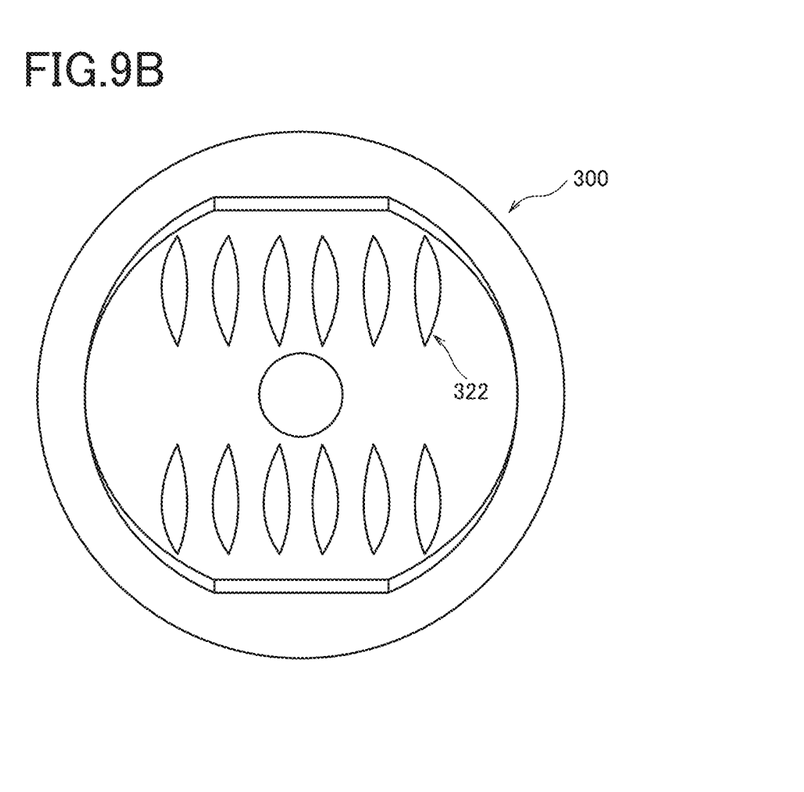
FIG. 9B is a plan view of a rack guide according to a second variant of the present invention.
Figure 9C:
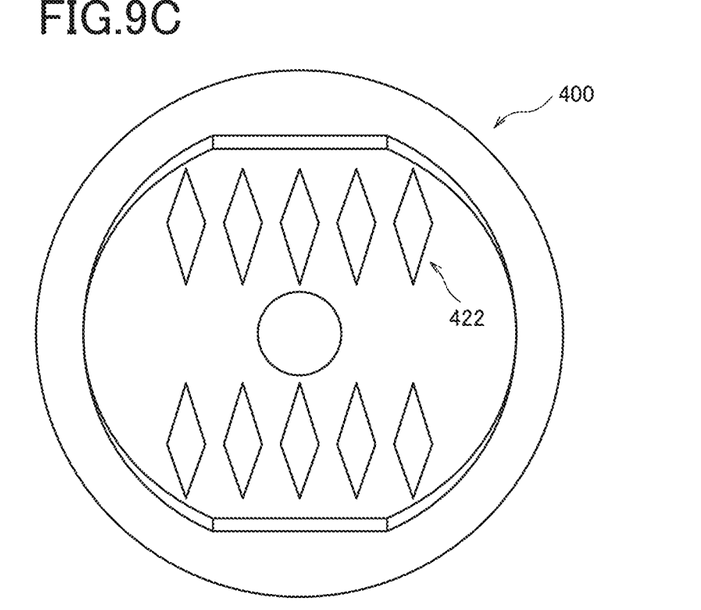
FIG. 9C is a plan view of a rack guide according to a third variant of the present invention.

For example, in the above embodiment, the lubricant retaining groove 122 formed in the seat 120 is formed by the straight portion 122A and the arc-shaped bulge portion 122B as illustrated in FIG. 4, but the shape of the lubricant retaining groove is not limited to the above embodiment as long as the lubricant retaining groove bulges in the rack guide longitudinal direction and has an apex located in the contact area, and the lubricant retaining groove may have a shape, for example, as illustrated in FIG. 9A to FIG. 9C.

In other words, similarly to a rack guide 200 as illustrated in FIG. 9A which is a plan view of a rack guide according to a first variant of the present invention, a lubricant retaining groove 222 may be formed by a straight portion 222A and a broken line bulge portion 222B, similarly to a rack guide 300 as illustrated in FIG. 9B which is a plan view of a rack guide according to a second variant of the present invention, a lubricant retaining groove 322 may be formed by two arc-shaped bulge portions or similarly to a rack guide 400 as illustrated in FIG. 9C which is a plan view of a rack guide according to a third variant of the present invention, a lubricant retaining groove 422 may be formed to have a diamond shape.

Figure 9D:
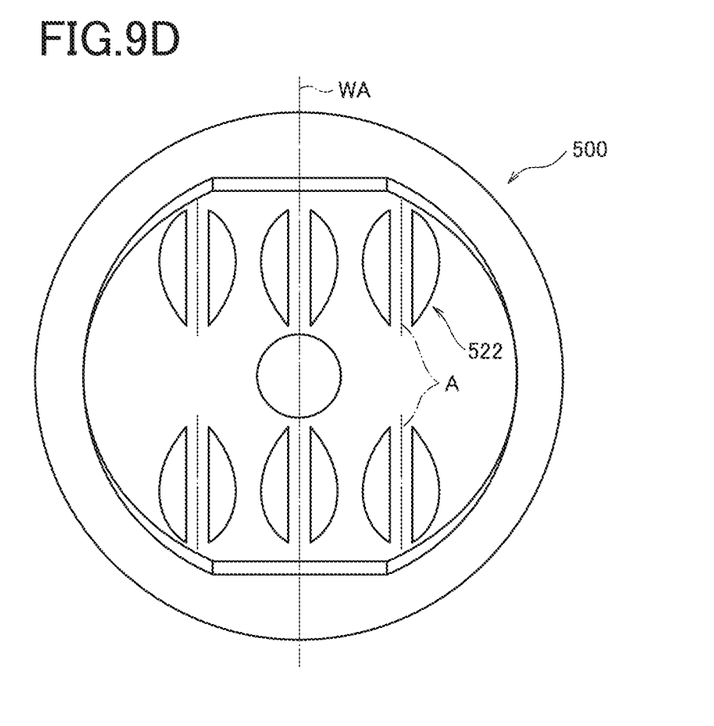
FIG. 9D is a plan view of a rack guide according to a fourth variant of the present invention.

For example, in the above embodiment, the pair of lubricant retaining grooves 122 formed in seat 120 are arranged about the seat transverse center axis WA, but the pair of lubricant retaining grooves according to the present invention are not limited to this configuration as long as the lubricant retaining grooves form a pair in the rack guide longitudinal direction. For example, similarly to a rack guide 500 as illustrated in FIG. 9D which is a plan view of a rack guide according to a fifth variant of the present invention, a pair of lubricant retaining grooves 522 may be formed about an axis of symmetry A parallel to the seat transverse center axis WA.

REFERENCE SIGNS LIST

100, 200, 300, 400 rack guide
110 rack guide body
111 seat placement groove
111*a* facing surface
111*a*1 seat engagement hole
120 seat
120A supporting surface
120A1 contact area
120A2 spaced facing area
120A2*i* spaced facing area on inner side
120A2*o* spaced facing area on outer side
121 convex portion
122, 222, 322, 422 lubricant retaining groove
122A, 222A straight portion
122B, 222B bulge portion
122B1 apex
122*a* vertical wall surface
122*b* inclined surface
SD rack and pinion steering device
SD1 device housing
SD2 steering shaft
SD2*a* pinion
SD3 rack bar
SD3*a* sliding surface
SD3*b* meshing surface (rack teeth)
SD4 biasing spring
GA rack guide center axis
LA seat longitudinal center axis (rack guide longitudinal center axis)
WA seat transverse center axis (rack guide transverse center axis)
A axis of symmetry
Rb radius of curvature of rack bar
Rs radius of curvature of seat
Os1 center of curvature of seat
Os2 center of curvature of seat
Ob center of curvature of rack bar
G lubricant

The invention claimed is:

1. A rack guide for a steering device, comprising a supporting surface for supporting a sliding surface provided behind a meshing surface formed on a rack bar having a D-shaped cross section, the rack bar being configured to mesh with a pinion formed on a steering shaft to convert a rotational motion of the steering shaft into a linear motion, the rack guide being configured to guide the rack bar in a bar longitudinal direction of the rack bar to change a steering angle of a tire, wherein:

the sliding surface of the rack bar is a curved surface formed to have a single radius of curvature, the supporting surface is a curved surface having a contact area configured to come into slidable contact with the rack bar and a spaced facing area configured to face the rack bar with a space therebetween, the contact area is located between the spaced facing area on an inner side closer to a rack guide longitudinal center axis configured to extend in a rack guide longitudinal direction parallel to a sliding direction of the rack bar and the spaced facing area on an outer side farther from the rack guide longitudinal center axis, and at least one pair of lubricant retaining grooves configured to retain a lubricant interposed between the rack bar and the supporting surface and face each other in the rack guide longitudinal direction extend in a rack guide transverse direction perpendicular to the rack guide longitudinal direction and are arranged on the supporting surface in such a shape as to bulge away from each other in the rack guide longitudinal direction, and an apex of each of the lubricant retaining grooves in the rack guide longitudinal direction is located in the contact area.

2. The rack guide according to claim 1, wherein the lubricant retaining groove is formed to be deeper in accordance with bulging of the lubricant retaining groove.

3. The rack guide according to claim 1, wherein the lubricant retaining groove is formed by a straight portion perpendicular to the contact area of the supporting surface, the contact area extending in the rack guide longitudinal direction, and a bulge portion passing both ends of the straight portion and the apex.

4. The rack guide according to claim 1, wherein the pair of lubricant retaining grooves are formed to be line-symmetrical, and groove depths of the pair of lubricant retaining grooves are equal to each other.

5. The rack guide according to claim 2, wherein the lubricant retaining groove is formed by a straight portion perpendicular to the contact area of the supporting surface, the contact area extending in the rack guide longitudinal direction, and a bulge portion passing both ends of the straight portion and the apex.

6. The rack guide according to claim 2, wherein the pair of lubricant retaining grooves are formed to be line-symmetrical, and groove depths of the pair of lubricant retaining grooves are equal to each other.

* * * * *